(12) United States Patent
Yamazaki (10) Patent No.: US 11,047,992 B2
(45) Date of Patent: Jun. 29, 2021

(54) POSITIONING METHOD AND POSITIONING TERMINAL

(71) Applicant: PANASONIC INTELLECTUAL PROPERTY MANAGEMENT CO., LTD., Osaka (JP)

(72) Inventor: Yasuhisa Yamazaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/615,669

(22) PCT Filed: Apr. 27, 2018

(86) PCT No.: PCT/JP2018/017139
§ 371 (c)(1),
(2) Date: Nov. 21, 2019

(87) PCT Pub. No.: WO2018/225421
PCT Pub. Date: Dec. 13, 2018

(65) Prior Publication Data
US 2020/0116873 A1    Apr. 16, 2020

(30) Foreign Application Priority Data
Jun. 9, 2017    (JP) .............................. JP2017-114627

(51) Int. Cl.
*G01S 19/49*    (2010.01)
*G01S 19/44*    (2010.01)
*G01S 19/45*    (2010.01)

(52) U.S. Cl.
CPC .............. *G01S 19/49* (2013.01); *G01S 19/44* (2013.01); *G01S 19/45* (2013.01)

(58) Field of Classification Search
CPC ......... G01S 2205/001; G01S 2205/002; G01S 19/40; G01S 19/41; G01S 19/42;
(Continued)

(56) References Cited

U.S. PATENT DOCUMENTS

| 2010/0048140 A1 | 2/2010 | Tajima et al. |
| 2014/0375497 A1 | 12/2014 | Friend et al. |
| 2016/0376772 A1 | 12/2016 | Kondo et al. |

FOREIGN PATENT DOCUMENTS

| JP | 07-104847 | 4/1995 |
| JP | 10-104015 A | 4/1998 |

(Continued)

OTHER PUBLICATIONS

International Search Report issued in International Patent Application No. PCT/JP2018/017139, dated Jul. 24, 2018.
(Continued)

*Primary Examiner* — Anthony R Jimenez
(74) *Attorney, Agent, or Firm* — Greenblum & Bernstein, P.L.C.

(57) ABSTRACT

In a case where a magnitude of a speed difference vector is smaller than a threshold in a state where a fixed solution is obtained continuously for a first time, a processor outputs a current RTK positioning solution as current coordinates of a moving object. On the other hand, when the magnitude of the speed difference vector is equal to or greater than the threshold in a state where the fixed solution is obtained continuously for the first time, the processor outputs a DR solution as the current coordinates of the moving object.

10 Claims, 6 Drawing Sheets

(58) Field of Classification Search
CPC ........ G01S 19/421; G01S 19/44; G01S 19/45;
G01S 19/47; G01S 19/48; G01S 19/49;
G01S 2205/008; G01S 2205/01; G01S
2201/00; G01S 2201/01; G01S 2201/02;
G01S 2201/04; G01S 2201/06; G01S
19/00; G01S 19/20; G01S 19/21; G01S
19/24; G01S 19/25; G01S 19/26; G01S
19/393; G01S 19/396; G01S 19/423;
G01S 19/425; G01S 19/43; G01S 19/46;
G01S 19/51
USPC ........................................................ 701/472
See application file for complete search history.

(56) References Cited

FOREIGN PATENT DOCUMENTS

| | | |
|---|---|---|
| JP | 2011-191087 | 9/2011 |
| WO | 2015/168460 A1 | 11/2015 |
| WO | 2015/186845 | 12/2015 |

OTHER PUBLICATIONS

The Extended European Search Report dated Apr. 29, 2020 for the related European Patent Application No. 18813039.7.

POSITIONING METHOD AND POSITIONING TERMINAL

TECHNICAL FIELD

The present disclosure relates to a positioning method and a positioning terminal when performing interference positioning by using a signal from a positioning satellite (hereafter, artificial satellites that can be used for positioning are collectively referred to as "satellite").

BACKGROUND ART

In the related art, in order to measure an object in a stationary state with high accuracy, interference positioning (RTK calculation) using a real time kinematic (RTK) method has been used. The RTK method is to perform positioning at a predetermined point by using a carrier phase integrated value of a positioning signal transmitted by a satellite. It is expected that high accurate positioning of the moving object is realized by applying the interferometric positioning by the RTK method to the positioning of the moving object.

A positioning terminal attached to a moving object such as a vehicle receives a positioning signal from a satellite (not shown) of a global navigation satellite system (GNSS) when performing an RTK calculation. GNSS is a generic term for satellite navigation systems with performance (accuracy and reliability) usable for civil aviation navigation such as global positioning system (GPS), BeiDou, GLONASS, and the like. The positioning signal includes a L1 signal (1575.42 MHz), a L2 signal (1227.60 MHz), and the like transmitted from the GPS satellite.

PTL 1 discloses a positioning terminal that measures both the position of a vehicle based on the positioning signal from a satellite (GPS position) and the position of the vehicle based on the speed of the vehicle (dead reckoning position) and outputs an GPS position in a case where the positioning accuracy of the GPS position satisfies a set level and outputs a dead reckoning position in a case where the positioning accuracy does not satisfy the set level.

Thus, in the related art, in positioning calculation such as RTK calculation, a technique is disclosed, in which, when a highly accurate positioning solution (fixed solution) is calculated, the positioning solution (fixed solution) is output, and when a low-accuracy positioning solution (float solution) is calculated, coordinates estimated by dead reckoning navigation are output.

CITATION LIST

Patent Literature

PTL 1: Japanese Patent Unexamined Publication No. 7-104847

SUMMARY OF THE INVENTION

In an environment where there is a lot of shielding such as in an urban area, a fixed solution that is significantly different from the coordinates of an actual moving object (hereinafter, referred to as "erroneous fix") is sporadically calculated in an RTK calculation.

One aspect of the present disclosure discloses a positioning method and a positioning terminal that can reduce the output of erroneous fixes and improve the accuracy of positioning.

A positioning method according to an aspect of the present disclosure is a positioning method for determining coordinates of a moving object by performing a positioning calculation based on information transmitted from a plurality of satellites by a positioning terminal, in which the positioning terminal calculates a fixed solution which is a solution obtained by the positioning calculation, calculates a dead reckoning (DR) solution that is an estimated value of coordinates of the moving object, based on coordinates indicated by the fixed solution, and outputs the DR solution as the coordinates of the moving object in a case where a difference between a solution newly obtained by the positioning calculation and a previous fixed solution is greater than or equal to a threshold in a state where the fixed solution is obtained continuously for a first time.

A positioning terminal according to one aspect of the present disclosure includes a receiver that receives positioning signals transmitted from a plurality of satellites, and a processor that determines coordinates of a moving object by performing a positioning calculation based on information included in the positioning signals, and the processor calculates a fixed solution which is a solution obtained by the positioning calculation, calculates a dead reckoning (DR) solution that is an estimated value of coordinates of the moving object, based on coordinates indicated by the fixed solution, and outputs the DR solution as the coordinates of the moving object in a case where a difference between a fixed solution newly obtained by the positioning calculation and a previous fixed solution is greater than or equal to a threshold in a state where the fixed solution is obtained continuously for a first time.

According to one aspect of the present disclosure, it is possible to reduce output of erroneous fixes and improve positioning accuracy.

DESCRIPTION OF EMBODIMENT

Hereinafter, embodiments of the present disclosure will be described in detail with reference to drawings as appropriate. However, detailed description may be omitted more than necessary. For example, there are cases where a detailed description of well-known matters and redundant description on substantially the same configuration may be omitted. This is for avoiding unnecessary redundancy of the following description and facilitating understanding by those skilled in the art.

The accompanying drawings and the following description are provided to enable those skilled in the art to fully understand the present disclosure and are not intended to limit the claimed subject matters.

<Configuration of Positioning System>

Figure 1:
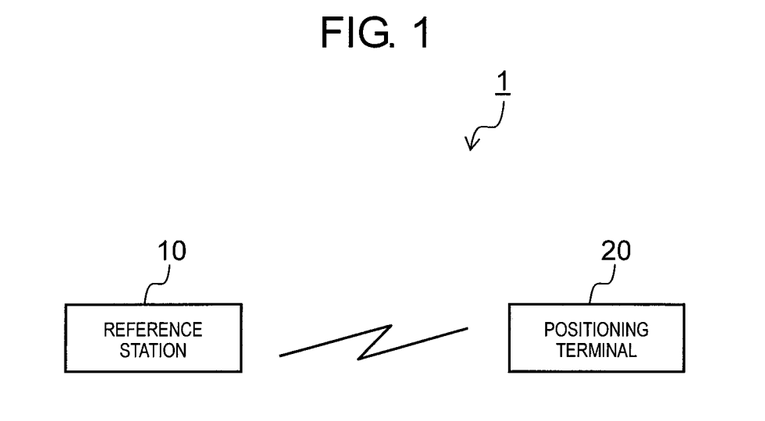
FIG. 1 is a diagram showing a configuration of a positioning system according to an embodiment.

First, the configuration of positioning system 1 according to the present embodiment will be described with reference to FIG. 1. As shown in FIG. 1, positioning system 1 includes reference station 10 and positioning terminal 20. Reference station 10 is installed at a location where the coordinates on the earth are known. Positioning terminal 20 is installed in a moving object (for example, a vehicle) to which coordinates are to be obtained.

Positioning system 1 measures the position of positioning terminal 20 and obtains the coordinates of positioning terminal 20 on the earth. The coordinates are generally three-dimensional coordinates of latitude, longitude, and altitude, for example, but may be two-dimensional coordinates such as latitude and longitude.

Reference station 10 generates positioning data (hereinafter, referred to as "reference station positioning data") of reference station 10 based on the positioning signal received from a GNSS satellite and transmits the positioning data to positioning terminal 20. Details of the positioning data will be described later.

Positioning terminal 20 generates the positioning data (hereinafter, referred to as "positioning terminal positioning data") of positioning terminal 20 based on the positioning signal received from the GNSS satellite, performs the interference positioning processing by an RTK method for each one epoch by using the reference station positioning data and the positioning terminal positioning data, and outputs the coordinates of the moving object. The epoch is data acquisition time, and an epoch interval is a time unit representing the time interval (cycle) of the data acquisition time. For example, in a case where positioning terminal 20 operates at 5 Hz, five pieces of data are acquired per second, and therefore the epoch interval is 0.2 seconds. Positioning terminal 20 includes a dedicated terminal for positioning, a personal computer having a positioning function, a smartphone, a tablet, a server that performs a positioning service, and the like.

<Configuration of Reference Station>

Figure 2:
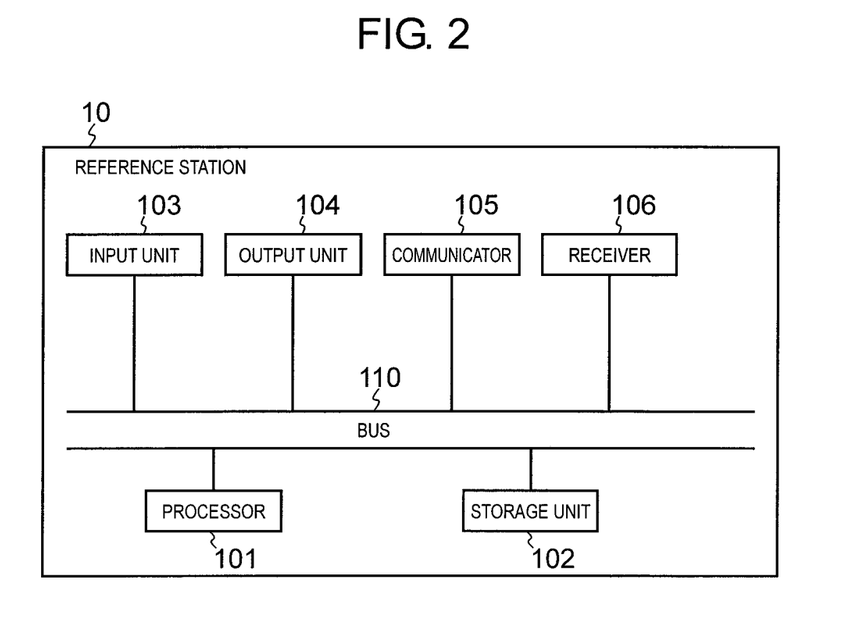
FIG. 2 is a block diagram showing a configuration of a reference station according to the embodiment.

Next, the configuration of reference station 10 according to the present embodiment will be described with reference to FIG. 2. As shown in FIG. 2, reference station 10 includes processor 101, storage unit 102, input unit 103, output unit 104, communicator 105, receiver 106, and bus 110.

Processor 101 controls other elements of reference station 10 via bus 110. As processor 101, for example, a general-purpose central processing unit (CPU) is used. In addition, processor 101 generates reference station positioning data based on the positioning signal by executing a predetermined program.

Storage unit 102 acquires various pieces of information from other elements and holds the information temporarily or permanently. Storage unit 102 is a generic name of a so-called primary storage device and secondary storage device. A plurality of storage units 102 may be physically disposed. As storage unit 102, for example, direct random access memory (DRAM), hard disk drive (HDD), or solid-state drive (SSD) is used.

Input unit 103 receives information from the outside. The information received from the outside by input unit 103 includes information on the inputs from an operator of reference station 10. As an example, input unit 103 may be configured by using an input interface such as a keyboard.

Output unit 104 presents information to the outside. The information presented by output unit 104 includes information on positioning and the like. As an example, output unit 104 may be configured by using an existing output interface such as a display.

Communicator 105 communicates with an external device via a communication path. A device (communicating target) to communicate with communicator 105 includes positioning terminal 20. As an example, communicator 105 may be configured by using a communication interface capable of communicating with an existing communication network such as a wireless LAN communication network, 3G communication network or the like.

Receiver 106 receives the positioning signal from the satellite and outputs the positioning signal to processor 101 via bus 110.

The configuration of reference station 10 is an example. It is also possible to integrate a part of each component of reference station 10. It is also possible to configure by dividing a part of each component of reference station 10 into a plurality of components. A part of respective components of reference station 10 may be omitted. It is also possible to configure by adding other components to reference station 10.

<Configuration of Positioning Terminal>

Figure 3:
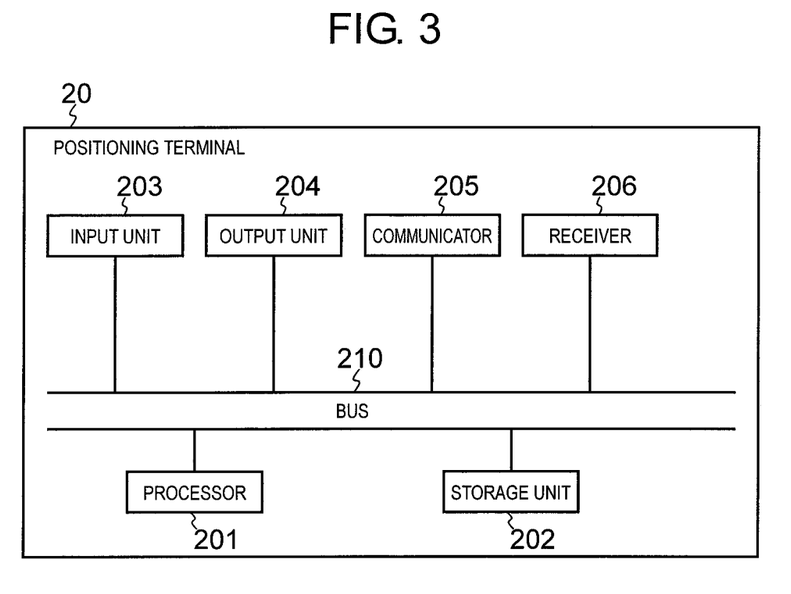
FIG. 3 is a block diagram showing a configuration of a positioning terminal according to the embodiment.

Next, the configuration of positioning terminal 20 according to the present embodiment will be described with reference to FIG. 3. As shown in FIG. 3, positioning terminal 20 includes processor 201, storage unit 202, input unit 203, output unit 204, communicator 205, receiver 206, and bus 210.

Processor 201 controls other elements of positioning terminal 20 via bus 210. As processor 201, for example, a general-purpose CPU is used. In addition, processor 201 executes a predetermined program to generate positioning terminal positioning data based on the positioning signal. In addition, in the present embodiment, processor 201 has a function of outputting coordinates of a moving object. Details of the function of this processor 201 will be described later.

Storage unit 202 acquires various pieces of information from other elements and holds the information temporarily or permanently. Storage unit 202 is a generic name of a so-called primary storage device and secondary storage device. A plurality of storage units 202 may be physically disposed. As storage unit 202, for example, DRAM, HDD, or SSD is used.

Input unit 203 receives information from the outside. The information received from the outside by input unit 203 includes information on the inputs from the operator of positioning terminal 20. As an example, input unit 203 may be configured by using an input interface such as a keyboard.

Output unit 204 presents information to the outside. The information presented by output unit 204 includes information on positioning and the like. As an example, output unit 204 may be configured by using an existing output interface such as a display.

Communicator 205 communicates with an external device via a communication path. A device (communicating target) to communicate with communicator 205 includes reference station 10. As an example, communicator 205 may be configured by using a communication interface capable of communicating with an existing communication network such as a wireless LAN communication network, 3G communication network or the like.

Receiver 206 receives the positioning signal from the satellite and outputs the positioning signal to processor 201 via bus 210.

The configuration of positioning terminal 20 is an example. It is also possible to configure by integrating a part of each component of positioning terminal 20. It is also possible to configure by dividing a part of each component of positioning terminal 20 into a plurality of components. A part of each component of positioning terminal 20 may be omitted. It is also possible to configure by adding other components to positioning terminal 20.

<Moving Object Coordinates Output Function of Processor of Positioning Terminal>

Next, the function of outputting the coordinates of the moving object of processor 201 of positioning terminal 20 will be described in detail.

Based on the reference station positioning data and the positioning terminal positioning data, processor 201 executes interference positioning (RTK calculation) using the RTK method for each one epoch to calculate a positioning solution (fixed solution or float solution). Hereinafter, the positioning solution obtained by the RTK calculation is referred to as "RTK positioning solution". Processor 201 performs a quality check using an ambiguity ratio (AR) value obtained by the RTK calculation, determines that the RTK positioning solution is a fixed solution in a case where the AR value is greater than or equal to a predetermined threshold (for example, 3.0), and determines that the RTK positioning solution is a float solution in a case where the AR value is less than the predetermined threshold (for example, 3.0).

Further, processor 201 estimates current coordinates of the moving object based on previous coordinates of the moving object and the information related to the speed of the moving object. The previous coordinates of the moving object are, for example, the coordinates output last time (that is, before one epoch). Processor 201 outputs the coordinates of the moving object for each epoch. In the present disclosure, the word "the current coordinates of the moving object" is used in the sense of contrasting the previous coordinates of the moving object, but "the current coordinates of the moving object" means the coordinates at which the moving object is assumed to exist after the "previous coordinates of the moving object", "current" does not necessarily mean the time at which the coordinate output device is operating. Information on the speed of the moving object is, for example, the speed of the moving object calculated from the Doppler frequency included in the positioning data or the speed of the moving object output from a speed detection module (not shown) provided in the moving object. Speed information is defined as a pair of movement amounts (movement direction vector) per unit time with respect to a predetermined dimension such as "X meter per second in a south direction, Y meter per second in an east direction, and Z meter per second in a height direction". Processor 201 calculates the movement direction vector (movement amount for one epoch) based on the Doppler frequency information or sensor information and adds the movement direction vector to the previous coordinates of the moving object (for example, the coordinates one epoch before) to estimate the current coordinates of the moving object. Coordinates estimated in this way are also called dead reckoning coordinates or dead reckoning (DR) solution.

In addition, in a case where a fixed solution may be obtained, processor 201 measures the time (hereinafter, referred to as "first time") during which a fixed solution is consecutively obtained and determines whether or not a first time has reached predetermined time T1 (for example, 20 seconds). Further, processor 201 measures the time during which a DR solution is continuously output (hereinafter, referred to as "second time") to determine whether or not the second time has reached predetermined time T2 (for example, 60 seconds). Processor 201 may count the number of times of positioning processing (data acquisition) corresponding to a first time and a second time. For example, in a case where the epoch interval is 0.2 seconds, when a fixed solution is obtained 100 times continuously, the first time has reached predetermined time T1 (=20 seconds), and when a DR solution are output 300 times continuously, the second time has reached predetermined time T2 (=60 seconds).

Then, processor 201 sets the RTK positioning solution (fixed solution or float solution) or DR solution as the current coordinates of the moving object under a predetermined condition and outputs the current coordinates of the moving object to output unit 204 for each epoch. The flow of positioning processing from when processor 201 performs positioning until the RTK positioning solution or DR solution is selected and output as the current coordinates of the moving object will be described later.

<Positioning Data>

Next, the positioning data will be described. In the present embodiment, the positioning data includes pseudo-distance information, carrier phase information, and Doppler frequency information.

Pseudo-distance information is information on the distance between the satellite and the own station thereof (reference station 10 or positioning terminal 20). The processor (processor 101 or processor 201) may calculate the distance between the satellite and the own station thereof by analyzing the positioning signal. Specifically, the processor first obtains the arrival time of the positioning signal based on two pieces of information (1) the difference between the pattern of the code carried by the positioning signal and the pattern of the code generated by the own station and (2) the signal-generated time of the satellite included in the message (NAVDATA) included in the positioning signal and the signal-received time of the own station. Then, the processor obtains the pseudo distance between the satellite and the own station thereof by multiplying the arrival time by the speed of light. This distance includes an error caused by a difference between the clock of the satellite and the clock of the own station and the like. Normally, pseudo-distance information is generated for four or more satellites to reduce this error.

The carrier phase information is the phase of the positioning signal received by the own station thereof. The positioning signal is a predetermined sinusoidal wave. The processor may calculate the phase of the positioning signal by analyzing the received positioning signal.

The Doppler frequency information is information on the relative speed between the satellite and the own station thereof. The processor may generate Doppler frequency information by analyzing the positioning signal.

As described above, the positioning data is generated by processor 101 of reference station 10 and processor 201 of positioning terminal 20, respectively.

<RTK Calculation>

RTK calculation will be described. The RTK calculation is an operation that executes the RTK method which is one of interference positioning.

The RTK method is to perform positioning at a predetermined point by using a carrier phase integrated value of a positioning signal transmitted by a satellite. The carrier phase integrated value is the sum of (1) the number of waves of the positioning signal from the satellite to a predetermined point and (2) the phase. Since the frequency (and wavelength) of the positioning signal is known if the carrier phase integrated value is obtained, the distance from the satellite to the predetermined point may be obtained. The number of waves of the positioning signal is called an integer ambiguity or an integer value bias since the number of waves is an unknown number.

What is important in executing the RTK method is removal of noise and estimation (determination) of integer ambiguity.

In the RTK method, noise may be removed by calculating a difference called double difference. The double difference is the difference between the values obtained by calculating the difference (single difference) between carrier phase integrated values of one receiver with respect to two satellites respectively between two receivers (in the present embodiment, reference station 10 and positioning terminal 20). In the present embodiment, four or more satellites are used for positioning using the RTK method. Therefore, the double difference is calculated by the combination of four or more satellites. In this calculation, reference station positioning data and positioning terminal positioning data are used.

In the RTK method, estimation of integer ambiguity may be performed in various ways. For example, estimation of integer ambiguity may be performed by executing the procedure of (1) estimation of a float solution by a least squares method and (2) verification of a fixed solution based on a float solution.

Estimation of a float solution by the least squares method is executed by preparing simultaneous equations by using a combination of double differences generated for each time unit and solving the prepared simultaneous equations by the least squares method. The simultaneous equations are generated for each epoch. In this calculation, the reference station positioning data, the positioning terminal positioning data, and the known coordinates of reference station 10 are used. The real number estimate of the integer ambiguity obtained in this way is called a float solution (estimated solution).

The float solution obtained in this way is a real number, whereas the true value of integer ambiguity is an integer. Therefore, it is necessary to work to round the float solution to an integer value. However, there are a plurality of candidates for combinations in rounding the float solution. Therefore, it is necessary to verify the correct integer value from the candidates. A solution that is considered to be somewhat more reliable as an integer bias by the test is called a fixed solution (precise positioning solution). In the present embodiment, the quality check is performed by using the AR value obtained by the RTK calculation, and the correct integer value is verified based on the result of the quality check. The reference station positioning data is used in order to efficiently narrow down the candidates for integer values.

<Example of Coordinate Output>

Figure 4:
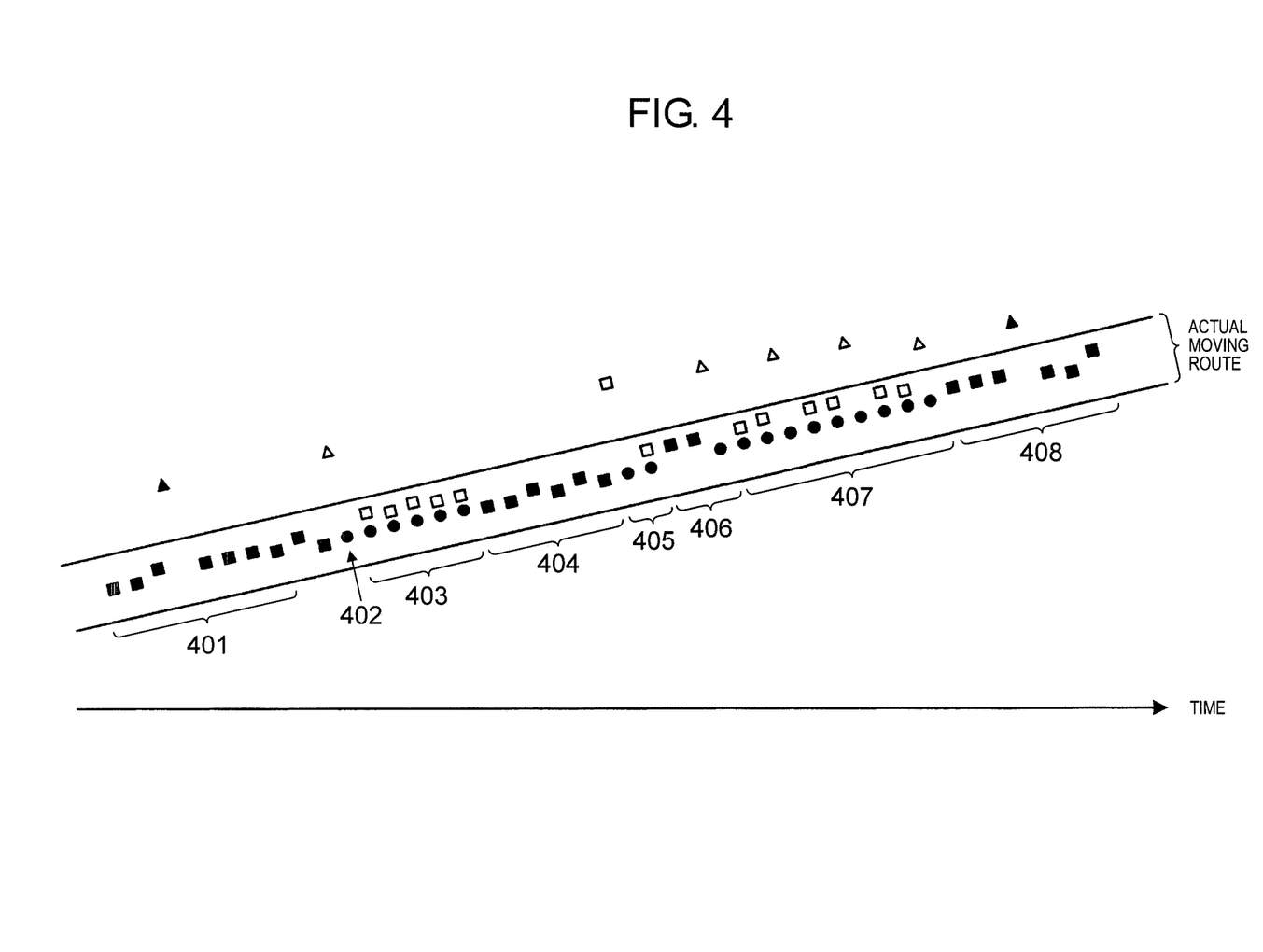
FIG. 4 is a diagram showing an example of coordinate output of the positioning terminal according to the embodiment.

Next, an example of the coordinate output of positioning terminal 20 according to the present embodiment will be described with reference to FIG. 4. In FIG. 4, the fixed solution is indicated by a square mark, the float solution is indicated by a triangle mark, and the DR solution is indicated by a circle mark. In addition, the solution to be output is shown in black, and the solution which is not output is shown in white.

Positioning terminal 20 outputs an RTK positioning solution (fixed solution or float solution) until the fixed solution is obtained continuously for the first time (five in the example of FIG. 4) (area 401).

In addition, positioning terminal 20 calculates and outputs the DR solution in a case where the float solution is calculated in the RTK calculation in a state where the fixed solution is obtained continuously for the first time or more (timing 402). Thereafter, the DR solution is output until the fixed solution is obtained continuously for the first time (area 403).

Further, in a case where a speed difference vector, which is the difference between a current speed vector based on a newly obtained fixed solution and a previous speed vector, is smaller than a threshold in a state where the fixed solution has been obtained continuously for the first time or more, positioning terminal 20 outputs the fixed solution (areas 404 and 406).

On the other hand, in a case where the magnitude of the speed difference vector is equal to or larger than a threshold in a state where the fixed solution is obtained continuously for the first time or more, positioning terminal 20 outputs the DR solution (area 405).

In addition, in a case where a DR solution is output continuously for the second time (10 in the example of FIG. 4) (area 407), thereafter, positioning terminal 20 outputs an RTK positioning solution (fixed solution or float solution) (area 408).

<Flow of Positioning Processing>

Figure 5A:
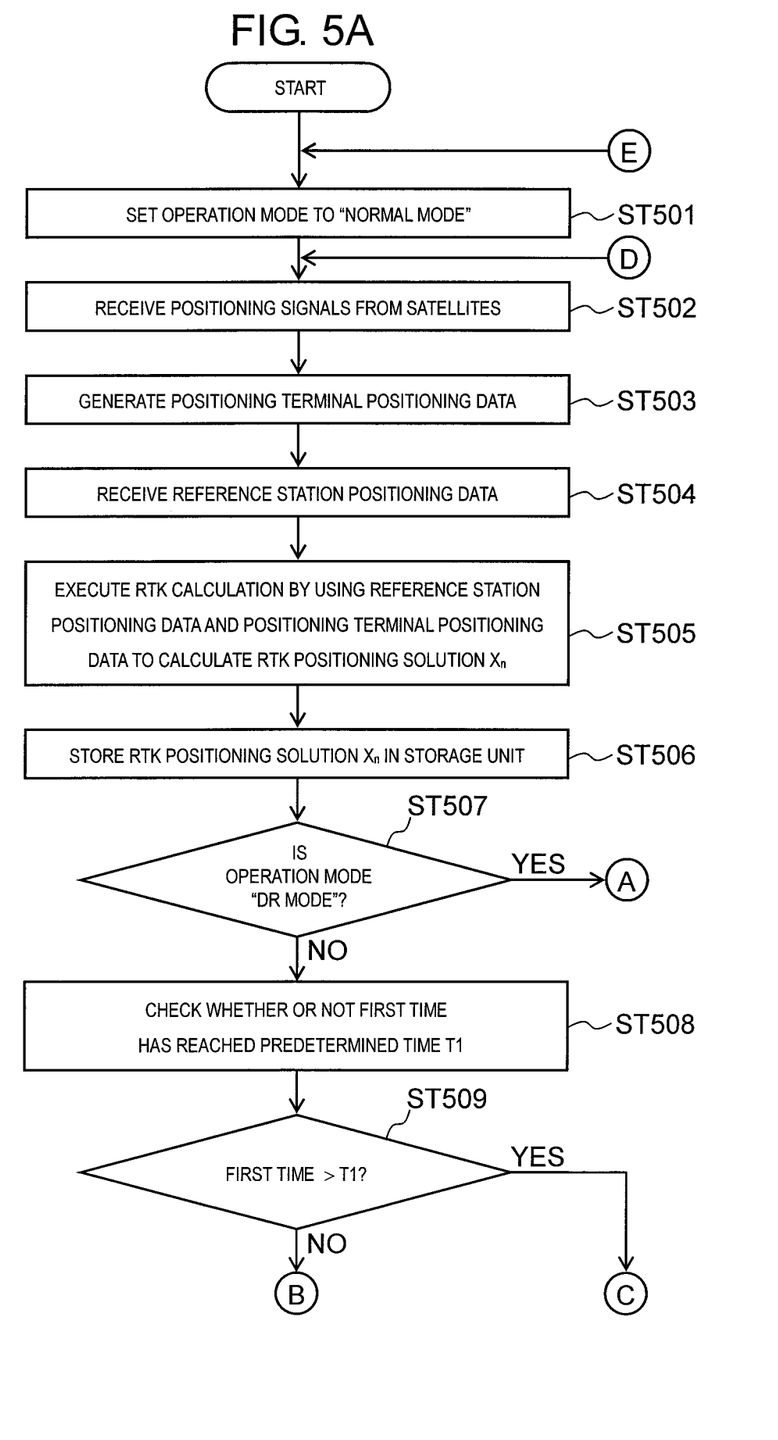
FIG. 5A is a flowchart showing positioning processing according to the embodiment.
Figure 5B:
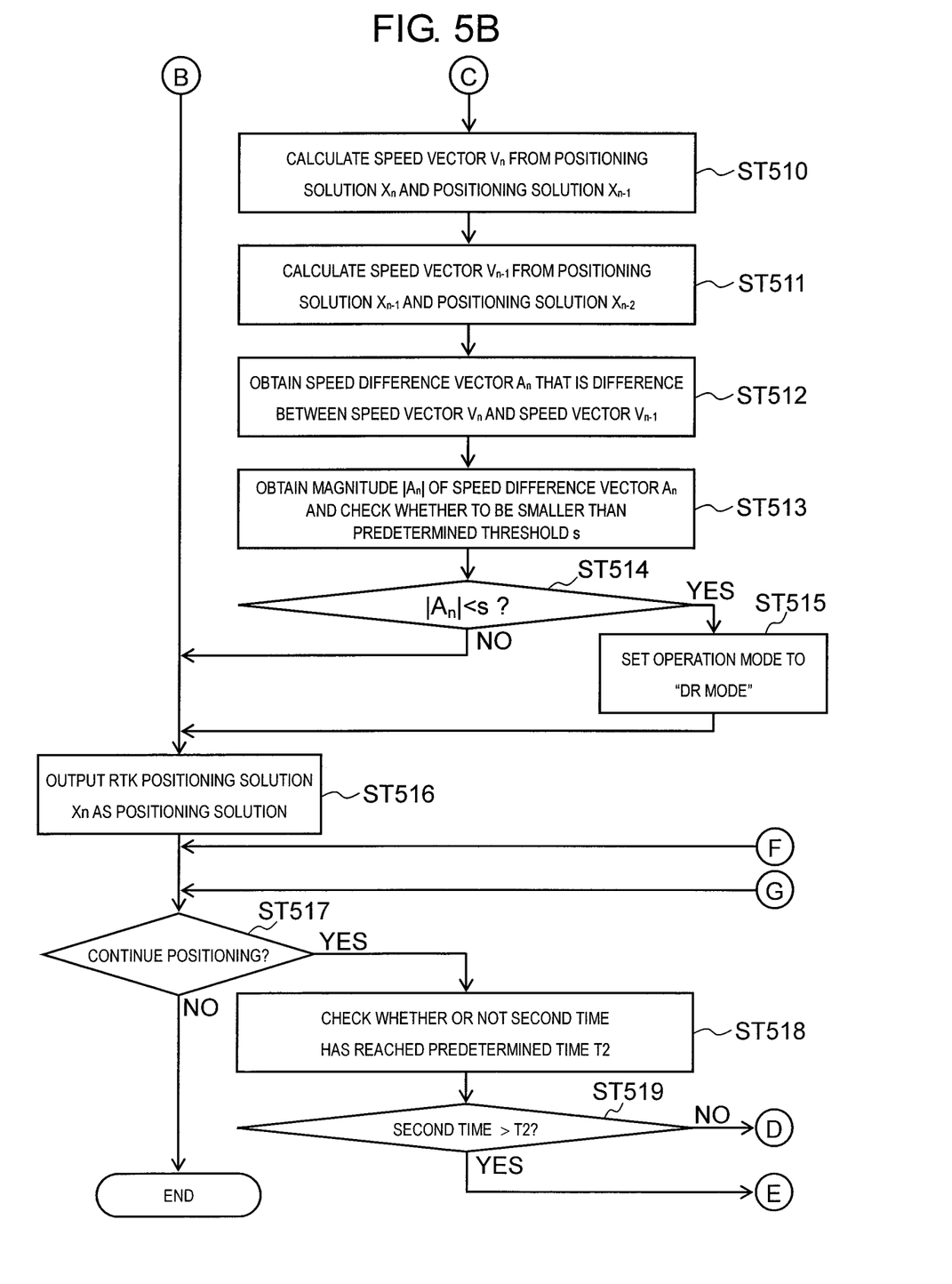
FIG. 5B is a flowchart showing positioning processing according to an embodiment.
Figure 5C:
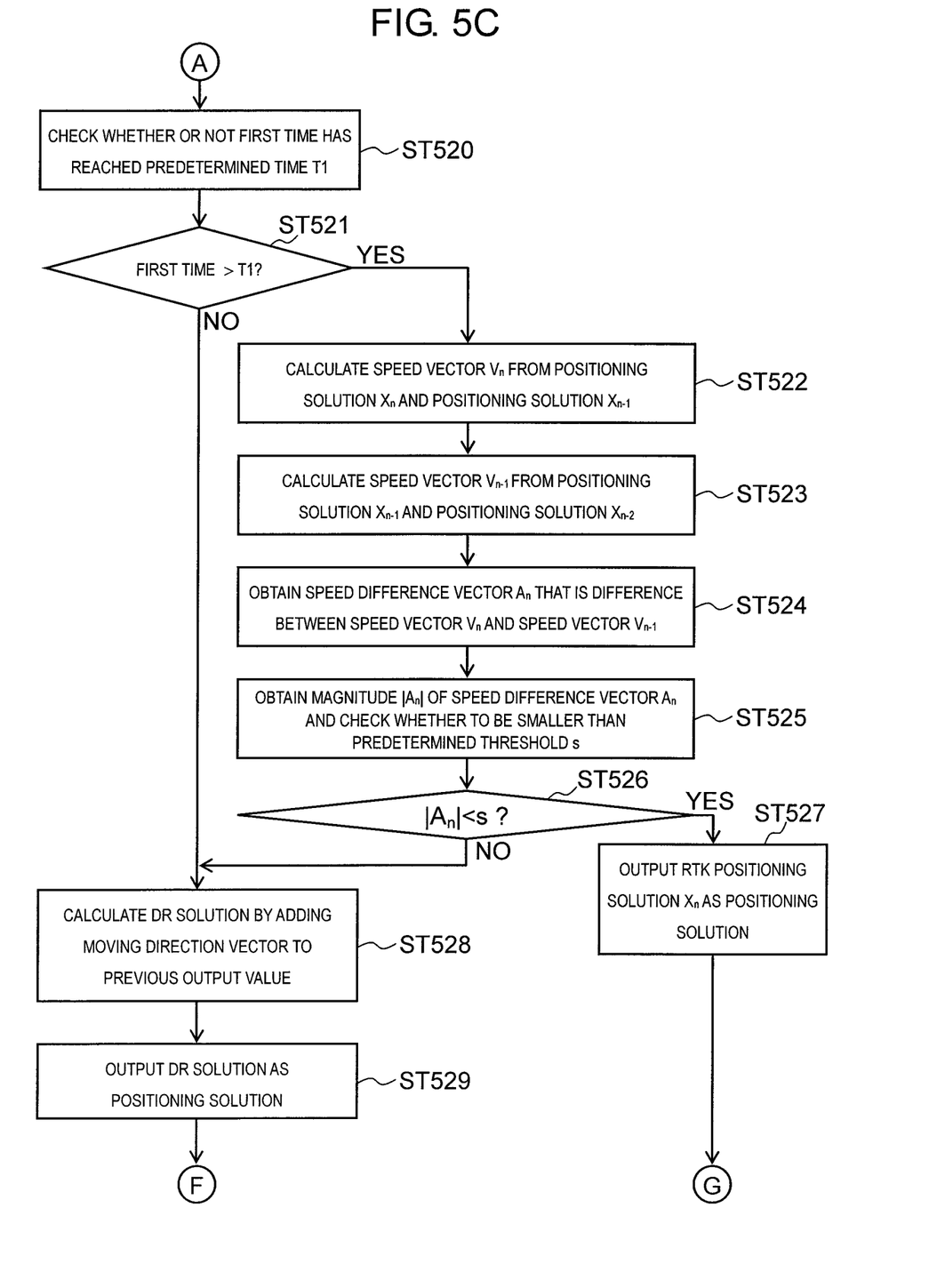
FIG. 5C is a flowchart showing positioning processing according to the embodiment.

Next, a flow of positioning processing according to the present embodiment will be described with reference to FIGS. 5A, 5B, and 5C. In the present embodiment, an example in which positioning terminal 20 performs positioning processing will be described. However, the positioning processing according to the present disclosure is not limited to being performed by positioning terminal 20 and may be executed by a general-purpose computer added inside positioning system 1, for example. The timing of starting positioning processing is not particularly limited. For example, the positioning processing may be started when the power of positioning terminal 20 is turned on. In addition, the positioning processing may be started when a command to start the positioning processing is input by input unit 203 of positioning terminal 20.

First, in ST501, processor 201 sets an operation mode to "normal mode". The "normal mode" is a mode in which an RTK positioning solution (fixed solution or float solution) is always output without outputting the DR solution.

Next, in ST502, receiver 206 receives positioning signals from all receivable satellites. In ST503, processor 201 generates positioning terminal positioning data by using the positioning signal. In ST504, communicator 205 receives reference station positioning data from reference station 10.

Next, in ST505, processor 201 executes RTK calculation by using the reference station positioning data and the positioning terminal positioning data to calculate current RTK positioning solution $X_n$ (n is a time variable based on current time).

Next, in ST506, processor 201 stores current RTK positioning solution $X_n$ in storage unit 202.

After ST506, in the "normal mode" (ST507: NO), in ST508, processor 201 checks whether or not the first time during which the fixed solution is continuously obtained has reached predetermined time T1, that is, whether or not all of RTK positioning solutions $X_{n-T1}$ to $X_n$ at predetermined time T1 up to the present are fixed solutions.

In a case where the first time has reached predetermined time T1, that is, in a case where all of RTK positioning solutions $X_{n-T1}$ to $X_n$ are fixed solutions (ST509: YES), in ST510, processor 201 calculates current speed vector $V_n$ based on a difference between current RTK positioning solution $X_n$ and previous RTK positioning solution $X_{n-1}$.

Furthermore, in ST511, processor 201 calculates previous speed vector $V_{n-1}$ from the difference between previous RTK positioning solution $X_{n-1}$ and previous RTK positioning solution $X_{n-2}$.

In ST512, processor 201 calculates speed difference vector $A_n$ that is a difference between current speed vector $V_n$ and previous speed vector $V_{n-1}$.

Next, in ST513, processor 201 compares speed difference vector magnitude $|A_n|$ with predetermined threshold s.

In a case where magnitude $|A_n|$ of the speed difference vector is smaller than threshold s (ST514: YES), in ST515, processor 201 sets the operation mode to "DR mode". The "DR mode" is a mode for selectively outputting a DR solution or an RTK positioning solution (fixed solution). In ST516, processor 201 outputs current RTK positioning solution $X_n$ (fixed solution) as the current coordinates of the moving object.

On the other hand, in a case where magnitude $|A_n|$ of the speed difference vector is greater than or equal to threshold s (ST514: NO), in ST516, processor 201 outputs current RTK positioning solution $X_n$ (fixed solution) as the current coordinates of the moving object.

Also, in a case where any of RTK positioning solutions $X_{n-T1}$ to $X_n$ is not a fixed solution (turned out to be a float solution) (ST509: NO), in ST516, processor 201 outputs current RTK positioning solution $X_n$ (fixed solution or float solution) as the current coordinates of the moving object.

When the positioning is not continued after ST516 (ST517: NO), the positioning processing ends. On the other hand, when positioning is continued (ST517: YES), in ST518, processor 201 checks whether or not the second time during which the DR solution is continuously output has reached predetermined time T2.

In a case where the second time has not reached predetermined time T2 (ST519: NO), the flow returns to ST502. In addition, in a case where the second time has reached predetermined time T2 (ST519: YES), the flow returns to ST501.

After ST506, in the "DR mode" (ST507: YES), in ST520, processor 201 checks whether or not the first time during which the fixed solution is continuously obtained has reached predetermined time T1, that is, whether or not all of RTK positioning solutions $X_{n-T1}$ to $X_n$ at predetermined time T1 up to the present are fixed solutions.

In a case where the first time has reached predetermined time T1, that is, in a case where all of RTK positioning solutions $X_{n-T1}$ to $X_n$ are fixed solutions (ST521: YES), in ST522, processor 201 calculates current speed vector $V_n$ based on a difference between current RTK positioning solution $X_n$ and previous RTK positioning solution $X_{n-1}$.

Furthermore, in ST523, processor 201 calculates previous speed vector $V_{n-1}$ from the difference between previous RTK positioning solution $X_{n-1}$ and previous RTK positioning solution $X_{n-2}$.

In ST524, processor 201 calculates speed difference vector $A_n$ that is a difference between current speed vector $V_n$ and previous speed vector $V_{n-1}$.

Next, in ST525, processor 201 compares speed difference vector magnitude $|A_n|$ with predetermined threshold s.

In a case where magnitude $|A_n|$ of the speed difference vector is smaller than threshold s (ST526: YES), in ST527, processor 201 outputs current RTK positioning solution $X_n$ (fixed solution) as the current coordinates of the moving object. Thereafter, the flow proceeds to ST517.

On the other hand, in a case where magnitude $|A_n|$ of the speed difference vector is equal to or greater than threshold value s (ST526: NO), in ST528, processor 201 calculates a DR solution by adding the moving direction vector to the previous output value.

Also, in a case where any of RTK positioning solutions $X_{n-T1}$ to $X_n$ is not a fixed solution (turned out to be a float solution) (ST521: NO), in ST528, processor 201 calculates a DR solution by adding the moving direction vector to the previous output value.

Then, after ST528, in ST529, processor 201 outputs the DR solution as the current coordinates of the moving object. Thereafter, the flow proceeds to ST517.

<Effect>

As described above, in the present embodiment, in a state where a fixed solution is obtained continuously for a predetermined time, it is estimated, even in a case where the fixed solution is obtained, that the fixed solution is an erroneous fix and a DR solution is output, if magnitude $|A_n|$ of the speed difference vector of the fixed solution is greater than or equal to threshold s.

This can reduce the output of erroneous fixes. In addition, the DR solution output in this case is obtained based on the latest fixed solution after the fixed solution has been obtained continuously for a predetermined time, and this latest fixed solution is likely to indicate correct coordinates. Therefore, in such a situation, it can be expected that the DR solution based on past correct coordinates is more accurate than the fixed solution (that is, fixed solution with large speed difference vector) that is likely to be fixed to an incorrect coordinate due to reflection or the like. Therefore, the present embodiment can improve positioning accuracy.

In the present embodiment, in a state where the fixed solution is obtained continuously for a predetermined time, a DR solution is output when a float solution is obtained. In addition, the DR solution output in this case is obtained based on the latest fixed solution after the fixed solution has been obtained continuously for a predetermined time, and this latest fixed solution is likely to indicate correct coordinates. Therefore, in such a situation, it can be expected that the DR solution is more accurate than the float solution. Therefore, since a highly accurate DR solution can be output in the present embodiment, it is possible to improve positioning accuracy.

In the present embodiment, in a case where a DR solution is output continuously for the second time, an RTK positioning solution is output. Since the DR solution is calculated by adding the speed to reference coordinates, and the like, errors accumulate over time and the accuracy deteriorates. Therefore, after a long period of time, even if the RTK positioning solution is not sufficiently reliable, there is a high possibility that the accuracy of the DR solution is deteriorated more than the RTK positioning solution is. Therefore, in such a case, the degradation of positioning accuracy can be reduced by switching the output solution to the RTK positioning solution.

In the present disclosure, the type, placement, the number, and the like of the members are not limited to the above-described embodiments, and the components thereof may be appropriately replaced with ones having the same effect and may be appropriately changed without departing from the gist of the invention.

For example, in the above embodiment, the case where a fixed solution is always output when magnitude $|A_n|$ of the speed difference vector of the fixed solution is smaller than threshold value s in a state where the fixed solution is obtained continuously for the first time, has been described, but the present disclosure is not limited thereto. When a DR solution is output in a state where a fixed solution is obtained continuously for the first time, a fixed solution may be output in a case where magnitude $|A_n|$ of the speed difference vector of the fixed solution is smaller than threshold value s for a third time continuously, and a DR solution may be output until then. The condition for stopping the output of a DR solution and switching to the output of a fixed solution is not limited thereto. For example, a user may be allowed to switch the output by his or her own input. Such a configuration is useful when, for example, the coordinates calculated by the DR solution are clearly degraded even when viewed from the user's eyes.

In the above embodiment, the case where the magnitude of the speed difference vector is used to detect an erroneous fix has been described, but the present disclosure is not limited thereto, and other information from which the occurrence of an erroneous fix can be predicted may be used. For example, the occurrence of an erroneous fix can be estimated by examining the change in the angle of the speed vector. In the case of using an angle, it is conceivable to detect that the direction of the speed vector is rotated by a predetermined angle or more (for example, 180 degrees). Further, in order to improve the accuracy of determination of erroneous fixes, a plurality of criteria such as a combination of speed difference and angle may be used in combination. In the above modification example, a change in angle or the like may be used instead of the speed difference vector, even in a case where a fixed solution with a small speed difference vector is obtained for the third time continuously and the output of a DR solution is stopped and the flow is returned to the output of a fixed solution.

Further, in the above embodiment, positioning terminal 20 may notify the user whether a currently output solution is an RTK operation solution or a DR solution. As a notification method, for example, various methods such as displaying on a screen (not shown) of a display unit of a moving object or notifying by voice can be considered.

In addition, in the above embodiment, the case of performing the RTK calculation as an example of the positioning calculation has been described, but the present disclosure is not limited thereto and a positioning calculation other than the RTK calculation may be performed. When performing positioning calculation other than RTK calculation, positioning calculation other than satellite navigation system may be used. Specifically, in indoors where it is difficult to use satellite navigation, it is conceivable that a marker or the like installed on a wall is imaged with a stereo camera and the position is calculated backward from the parallax. That is, in the present disclosure, any method may be used as long as the method is a positioning method capable of estimating a position with high accuracy if no error occurs.

Each functional block used in the description of the above embodiment is typically realized as an LSI which is an integrated circuit. These may be individually made into one chip, or may be made into one chip so as to include a part or all thereof. The name used here is LSI, but may also be called IC, system LSI, super LSI, or ultra LSI depending on the degree of integration.

Further, the method of circuit integration is not limited to LSI, and implementation using dedicated circuitry or general purpose processors is also possible. A field programmable gate array (FPGA) that can be programmed after manufacturing the LSI or a reconfigurable processor in which the connection and setting of circuit cells inside the LSI can be reconfigured may be used.

Further, if integrated circuit technology comes out to replace LSI as a result of the advancement of semiconductor technology or a derivative other technology, it is naturally also possible to carry out function block integration using this technology. Biotechnology can be applied.

INDUSTRIAL APPLICABILITY

The present disclosure is suitable for use when performing interference positioning by using a signal from a satellite.

REFERENCE MARKS IN THE DRAWINGS

1 POSITIONING SYSTEM
10 REFERENCE STATION
20 POSITIONING TERMINAL
101, 201 PROCESSOR
102, 202 STORAGE UNIT
103, 203 INPUT UNIT
104, 204 OUTPUT UNIT
105, 205 COMMUNICATOR
106, 206 RECEIVER
110, 210 BUS

The invention claimed is:

1. A positioning method for determining coordinates of a moving object by performing a positioning calculation based on information transmitted from a plurality of satellites by a positioning terminal,
wherein the positioning terminal
calculates a fixed solution which is a solution obtained by the positioning calculation,
calculates a dead reckoning (DR) solution that is an estimated value of coordinates of the moving object, based on coordinates indicated by the fixed solution, and
outputs the DR solution as the coordinates of the moving object in a case where a difference between a solution newly obtained by the positioning calculation and a previous fixed solution is greater than or equal to a threshold in a state where the fixed solution is obtained continuously for a first time.

2. The positioning method of claim 1,
wherein the difference is a magnitude of a speed difference vector that is a difference between a current speed vector based on a newly obtained fixed solution and a previous speed vector.

3. The positioning method of claim 1,
wherein the DR solution is output as the coordinates of the moving object regardless of the difference from the previous fixed solution in a case where a solution newly obtained by the positioning calculation is a float solution with lower accuracy than the fixed solution in a state where the fixed solution is obtained continuously for the first time.

4. The positioning method of claim 1,
wherein the solution obtained by the positioning calculation is output as the coordinates of the moving object in a case where the DR solution is output continuously for a second time.

5. The positioning method of claim 1,
wherein, when the DR solution is output in a state where the fixed solution is obtained continuously for the first time, the fixed solution is output as the coordinates of the moving object in a case where the difference is smaller than the threshold for a third time continuously.

6. The positioning method of claim 1, wherein a solution obtained by the positioning calculation is output in a state where the fixed solution has not been obtained continuously for the first time, regardless of the difference between the solution newly obtained and the previous fixed solution.

7. The positioning method of claim 1, wherein the positioning calculation is a real time kinematic (RTK) positioning calculation.

8. A positioning terminal comprising:

a receiver that receives positioning signals transmitted from a plurality of satellites; and a processor that determines coordinates of a moving object by performing a positioning calculation based on information included in the positioning signals, wherein the processor calculates a fixed solution which is a solution obtained by the positioning calculation, calculates a dead reckoning (DR) solution that is an estimated value of coordinates of the moving object, based on coordinates indicated by the fixed solution, and outputs the DR solution as the coordinates of the moving object in a case where a difference between a fixed solution newly obtained by the positioning calculation and a previous fixed solution is greater than or equal to a threshold in a state where the fixed solution is obtained continuously for a first time.

9. The positioning terminal of claim 8, wherein the processor outputs a solution obtained by the positioning calculation in a state where the fixed solution has not been obtained continuously for the first time, regardless of the difference between the fixed solution newly obtained and the previous fixed solution.

10. The positioning terminal of claim 8, wherein the positioning calculation is a real time kinematic (RTK) positioning calculation.

* * * * *